United States Patent
Jung et al.

(10) Patent No.: US 10,131,056 B2
(45) Date of Patent: Nov. 20, 2018

(54) MOBILE ROBOT HAVING REFLECTOR

(71) Applicant: Saeon Co., Ltd., Daejeon (KR)

(72) Inventors: Se-young Jung, Daejeon (KR); Jin-hyun Kim, Daejeon (KR); Suk bum Kang, Daejeon (KR)

(73) Assignee: SAEON CO., LTD., Daejeon (KR)

( * ) Notice: Subject to any disclaimer, the term of this patent is extended or adjusted under 35 U.S.C. 154(b) by 0 days.

(21) Appl. No.: 15/371,881

(22) Filed: Dec. 7, 2016

(65) Prior Publication Data
US 2017/0157771 A1    Jun. 8, 2017

(30) Foreign Application Priority Data
Dec. 7, 2015    (KR) .................. 10-2015-0173466

(51) Int. Cl.
*B25J 9/16*    (2006.01)
*G05D 1/02*    (2006.01)

(52) U.S. Cl.
CPC .......... *B25J 9/1697* (2013.01); *G05D 1/0242* (2013.01); *Y10S 901/01* (2013.01)

(58) Field of Classification Search
CPC .......... G01T 7/00; G01T 1/169; G05D 1/0242; Y10S 901/01; B25J 9/1697
See application file for complete search history.

(56) References Cited

U.S. PATENT DOCUMENTS

| | | | |
|---|---|---|---|
| 4,968,878 A * | 11/1990 | Pong .................. | A47L 11/4011 15/319 |
| 9,811,089 B2 * | 11/2017 | Lindhe ................ | G05D 1/0221 |
| 2007/0145235 A1 * | 6/2007 | Chen .................... | G01C 21/02 250/206.2 |
| 2007/0156286 A1 * | 7/2007 | Yamauchi ............ | G05D 1/0038 700/245 |

* cited by examiner

*Primary Examiner* — David Porta
*Assistant Examiner* — Faye Boosalis
(74) *Attorney, Agent, or Firm* — Rabin & Berdo, P.C.

(57) ABSTRACT

Disclosed is a mobile robot having a reflector including: a reflector detachably provided at a side of a front surface of a body of the mobile robot; and an infrared sensor including: an infrared transmitter emitting infrared light to the reflector and an obstacle; and an infrared receiver receiving both the infrared light reflected from a line on a floor after being reflected from a wing of the reflector and the infrared light reflected from the obstacle.

5 Claims, 2 Drawing Sheets

MOBILE ROBOT HAVING REFLECTOR

CROSS REFERENCE TO RELATED APPLICATION

The present application claims priority to Korean Patent Application No. 10-2015-0173466, filed on Dec. 7, 2015, the entire contents of which is incorporated herein for all purposes by this reference.

BACKGROUND OF THE INVENTION

Field of the Invention

The present invention relates generally to a mobile robot. More particularly, the present invention relates to a mobile robot using a reflector so as to sense an obstacle and a line on a floor.

Description of the Related Art

Generally, a mobile robot uses an obstacle sensor sensing an obstacle and a floor sensor sensing a floor so as to sense the surrounding environment.

That is, independently operated dual sensors, such as an obstacle sensor sensing an obstacle located on a path of a mobile robot and a floor sensor sensing a floor when the mobile robot with casters moves or changes its direction, are provided in the mobile robot.

In this case, infrared light or ultrasonic waves are mainly utilized in the floor sensor, and a contact switch generating an electric current by a physical impact generated by coming into direct contact with an obstacle is utilized in the obstacle sensor.

However, since the mobile robot according to the related art is operated by using the dual sensors, signal processing of the dual sensors for controlling the mobile robot is delayed. Further, when the signal processing is delayed, a braking distance of the mobile robot becomes longer.

Furthermore, although a function of sensing an obstacle and a function of sensing a floor are the same characteristics for controlling the mobile robot, unnecessary expenses are incurred due to the use of the dual sensors.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a mobile robot using a reflector so as to integrally sense a front obstacle and a line on a floor.

In order to achieve the above object, according to one aspect of the present invention, there is provided a mobile robot having a reflector, the mobile robot including: a reflector detachably provided at a side of a front surface of a body of the mobile robot; and an infrared sensor including: an infrared transmitter emitting infrared light to the reflector and an obstacle; and an infrared receiver receiving both the infrared light reflected from a line on a floor after being reflected from a wing of the reflector and the infrared light reflected from the obstacle.

Here, the reflector may include: a fan-shaped panel; and a wing standing on the fan-shaped panel at a predetermined angle.

In this case, the wing may stand at an angle between 20° and 80° based on the fan-shaped panel.

Furthermore, the infrared sensor may be provided on the front surface of the body of the mobile robot.

Furthermore, the infrared light emitted at a predetermined angle from the infrared transmitter installed on the front surface of the body of the mobile robot to the wing of the reflector may be reflected at a predetermined angle from the line on the floor, and may be projected on the infrared receiver.

Furthermore, the infrared light emitted from the infrared transmitter installed on the front surface of the body of the mobile robot to left and right sides of the reflector may be reflected from the obstacle, and may be projected on the infrared receiver.

According to an embodiment of the present invention, it is advantageous as follows. The present invention can simultaneously sense a front obstacle and a line on a floor by using a reflector and an infrared sensor, and thus can reduce delays in signal processing of sensors of a mobile robot. Furthermore, the present invention can reduce the number of sensors of the mobile robot, and thus can reduce manufacturing costs of the mobile robot.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
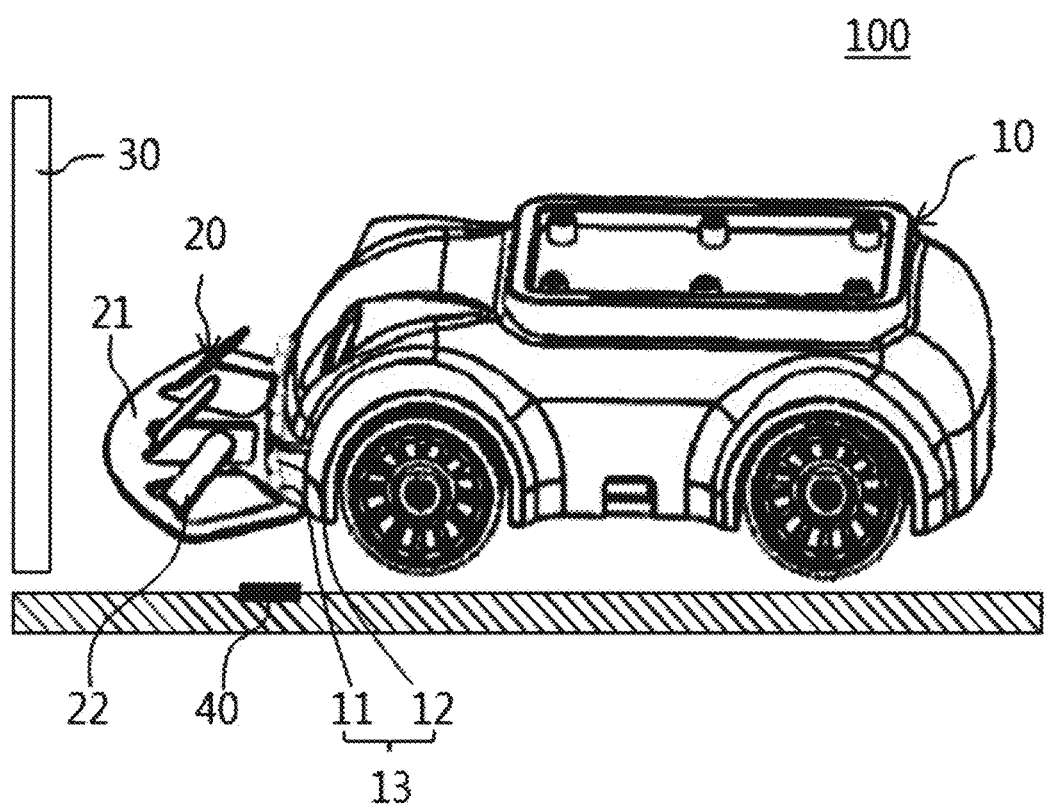
FIG. 1 is a side view illustrating the mobile robot having a reflector according to an embodiment of the present invention.

Hereinbelow, exemplary embodiments of the present invention will be described in detail with reference to the accompanying drawings. These embodiments will be described in detail in order to allow those skilled in the art to practice the present invention. The present invention may be embodied in many different forms without departing from the scope and spirit of the present invention, and the present invention should not be limited thereto. In the drawings, parts that are not related to descriptions of the present invention are omitted to clearly illustrate the present invention. Throughout the specification, the same reference symbols will refer to the same or like parts.

A mobile robot having a reflector according to the present invention is described with reference to the accompanying drawings.

Figure 2:
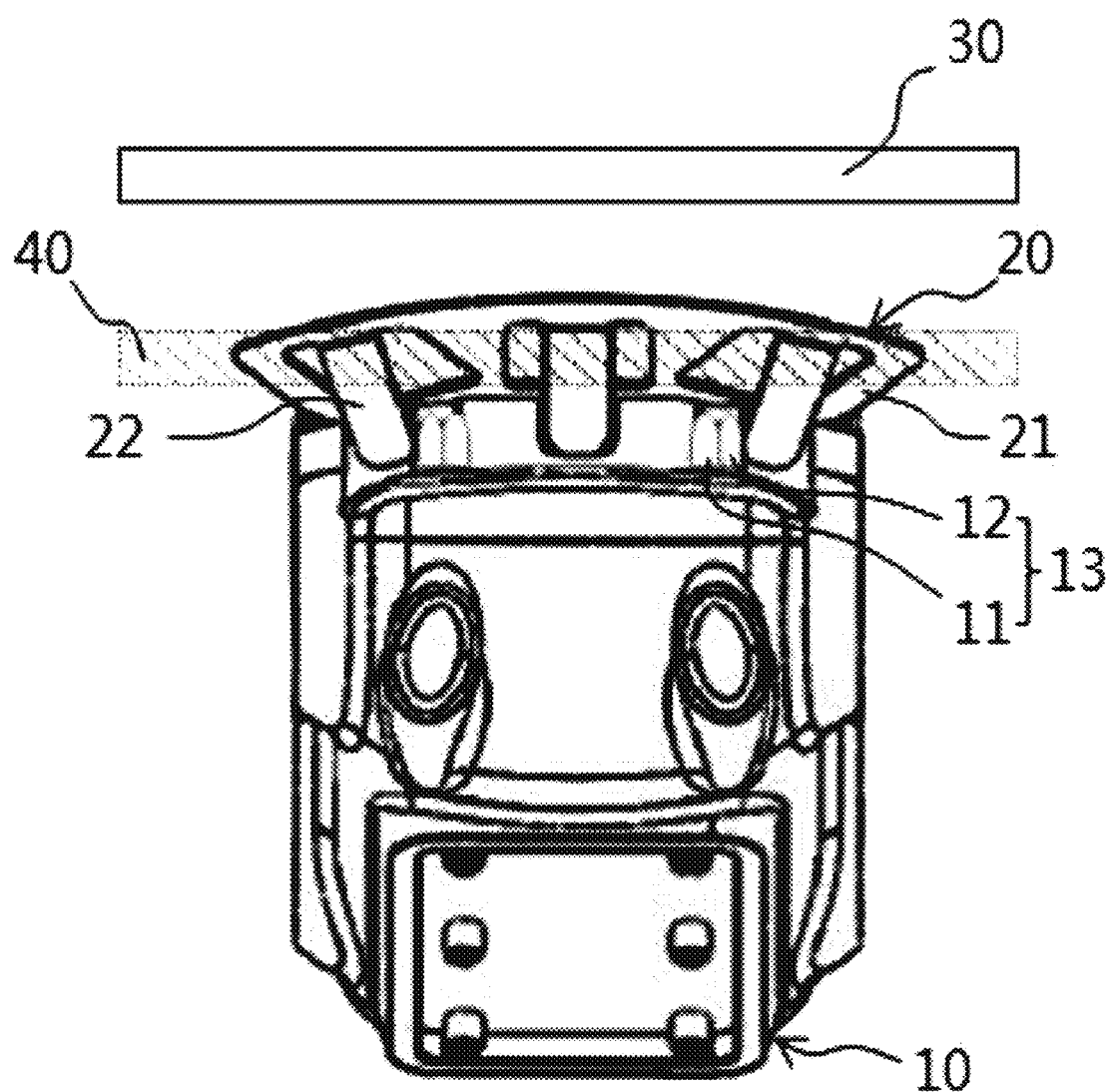
FIG. 2 is a plan view illustrating the mobile robot having the reflector according to the embodiment of the present invention.

FIG. 1 is a side view illustrating the mobile robot having the reflector according to an embodiment of the present invention, and FIG. 2 is a plan view illustrating the mobile robot having the reflector according to the embodiment of the present invention.

Referring to FIGS. 1 and 2, the mobile robot 100 according to the present invention includes: an infrared sensor 13 provided on a front surface of a body 10 of the mobile robot 100, the body 10 having casters; and the reflector 20 detachably provided at a side of the front surface of the body 10 of the mobile robot 100.

Here, the infrared sensor 13 is an integrated sensor including an infrared transmitter 11 emitting infrared light; and an infrared receiver 12 receiving the reflected infrared light. In this case, in the infrared sensor 13, the infrared transmitter 11 and the infrared receiver 12 may be disposed side by side in left and right diretions or in up and down directions. The number of infrared sensor 13 may be 1~5 as desired, but not limited thereto.

The reflector 20 may include a wing 22 formed by cutting a part of a fan-shaped panel 21 in a rectangular shape and by making the part stand up. In this case, the reflector 20 is made of a reflective material. Further, the number of wings 22 may be 1~5, but is not limited thereto.

Furthermore, the wing 22 is formed by standing at an angle between 20° and 80° based on the fan-shaped panel 21. Preferably, the wing 22 is formed by standing at an angle between 30° and 60° based on the fan-shaped panel 21.

Hereinafter, the mobile robot 100 having the reflector 20 capable of integrally sensing both an obstacle 30 and a line 40 of a floor is described in detail.

Infrared light emitted from an infrared emitting diode of the infrared transmitter 11 is reflected from the wing 22 of the reflector 20 that is formed at a predetermined angle relative to the infrared transmitter 11. In this case, it is preferable that the infrared light is emitted in a state of maintaining a 45° angle so that the infrared light is fully reflected from the wing 22 of the reflector 20.

Furthermore, the infrared light reflected from the wing 22 of the reflector 20 is reflected from the line 40 on the floor. Thus, the infrared light is received and is measured by the infrared receiver 12 so as to utilize the infrared light as a data for controlling the mobile robot 100.

In this case, the infrared light reflected from the wing 22 is reflected from both the colored line 40 on the floor and the floor, and the amount of the reflected infrared light varies depending on type of colors.

For example, when a black line is painted on a white floor, the amount of the reflected infrared light of the white floor is different from the amount of the reflected infrared light of the black line. Thus, the infrared receiver 12 recognizes the black line, and the mobile robot 100 may move along the black line.

Furthermore, part of the infrared light emitted from the infrared transmitter 11 straightly passes by left and right sides of the wing 22 of the reflector 20, and proceeds forward.

In this case, in order for the part of the infrared light to proceed forward, the infrared transmitter 11 having a wide emitting angle is utilized. Alternatively, when the infrared transmitter 11 having a limited emitting angle is utilized, a horizontal width of the wing 22 of the reflector 20 is controlled or a distance between the infrared transmitter 11 and the wing 22 is controlled.

In this case, the amount of the reflected infrared light is determined depending on an emitting distance of the infrared light, an emitting angle of the infrared light, and a size of the wing 22 of the reflector 20. Thus, the amount of the reflected infrared light is calculated, and may be appropriately utilized in the mobile robot 100.

Furthermore, the part of the infrared light proceeding forward is reflected from the front obstacle 30, and thus is received and is measured by the infrared receiver 12 so as to sense a location of the front obstacle 30.

Furthermore, the infrared sensor 13 provided on the front surface of the body 10 of the mobile robot 100 may be adjusted toward left and right sides of the mobile robot 100 at predetermined angles so as to sense obstacles located in left and right directions of the mobile robot 100.

As described, according to the mobile robot 100 of the present invention, the part of the infrared light emitted forward from the infrared transmitter 11 is reflected from the front obstacle 30, and is measured by the infrared receiver 12 so as to sense a location of the front obstacle 30. Further, another part of the infrared light emitted forward from the infrared transmitter 11 is reflected from the wing 22 of the reflector 20, is reflected from the line 40 on the floor, and is measured by the infrared receiver 12 so as to sense a location of the line 40.

According to the mobile robot 100 of the present invention, a function of sensing the front obstacle 30 and a function of sensing the line 40 on the floor may be integrated with each other by using the reflector 20 and the infrared sensor 13 including the infrared transmitter 11 and the infrared receiver 12.

Accordingly, in the present invention, a structure of sensors of a mobile robot can be simplified, and the number of infrared sensors can be reduced, thereby reducing manufacturing costs of a mobile robot. Furthermore, since a function of sensing a front obstacle and a function of sensing a line on a floor are integrated with each other, only a single sensing signal is processed, thereby increasing processing speed, and realizing prompt control of a mobile robot.

Although a preferred embodiment of the present invention has been described for illustrative purposes, the scope and spirit of the present invention are not limited thereto and those skilled in the art will appreciate that various modifications, additions and substitutions are possible, without departing from the scope and spirit of the present invention as disclosed in the accompanying claims.

What is claimed is:

1. A mobile robot having a reflector, the mobile robot comprising:
    a reflector detachably provided at a side of a front surface of a body of the mobile robot and including
        a fan-shaped panel, and
        a wing standing on the fan-shaped panel at a predetermined angle; and
    an infrared sensor including
        an infrared transmitter emitting infrared light to the reflector and an obstacle, and
        an infrared receiver receiving both the infrared light reflected from a line on a floor after being reflected from a wing of the reflector and the infrared light reflected from the obstacle.

2. The mobile robot of claim 1, wherein the wing stands at an angle between 20° and 80° based on the fan-shaped panel.

3. The mobile robot of claim 1, wherein the infrared sensor is provided on the front surface of the body of the mobile robot.

4. The mobile robot of claim 1, wherein the infrared light emitted at a predetermined angle from the infrared transmitter installed on the front surface of the body of the mobile robot to the wing of the reflector is reflected at a predetermined angle from the line on the floor, and is projected on the infrared receiver.

5. The mobile robot of claim 1, wherein the infrared light emitted from the infrared transmitter installed on the front surface of the body of the mobile robot to left and right sides of the reflector is reflected from the obstacle, and is projected on the infrared receiver.

* * * * *